US011853386B1

(12) United States Patent
Chen et al.

(10) Patent No.: US 11,853,386 B1
(45) Date of Patent: Dec. 26, 2023

(54) METHOD FOR RAPIDLY CALCULATING THREE-DIMENSIONAL POLARIMETRIC DIMENSION, DEVICE, AND STORAGE MEDIUM

(71) Applicant: SOOCHOW UNIVERSITY, Suzhou (CN)

(72) Inventors: Yahong Chen, Suzhou (CN); Chencheng Yan, Suzhou (CN); Fei Wang, Suzhou (CN); Yangjian Cai, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 17/924,484

(22) PCT Filed: Feb. 11, 2022

(86) PCT No.: PCT/CN2022/076028
§ 371 (c)(1),
(2) Date: Nov. 10, 2022

(87) PCT Pub. No.: WO2023/123617
PCT Pub. Date: Jul. 6, 2023

(30) Foreign Application Priority Data

Dec. 29, 2021 (CN) .......................... 202111627496.1

(51) Int. Cl.
*G06F 17/16* (2006.01)
(52) U.S. Cl.
CPC .................................... *G06F 17/16* (2013.01)
(58) Field of Classification Search
CPC ....................................................... G06F 17/16
USPC ....................................................... 708/607
See application file for complete search history.

(56) References Cited

U.S. PATENT DOCUMENTS

2014/0180655 A1    6/2014   Chipman et al.

FOREIGN PATENT DOCUMENTS

| CN | 110531530 A | 12/2019 |
| CN | 112904580 A | 6/2021 |
| CN | 114003195 A | 2/2022 |

OTHER PUBLICATIONS

Ruihuan Tong, "Fast calculation of partially coherent beams passing through a tightly focused system and its application" Master's Thesis, Soochow University, Feb. 15, 2021, pp. 14-28.

*Primary Examiner* — Tan V Mai
(74) *Attorney, Agent, or Firm* — SZDC Law PC

(57) ABSTRACT

The invention relates to a method for rapidly calculating a three-dimensional polarimetric dimension, including: determining that an incident light field is a coherence matrix of a partially coherent Schell-model beam, and decomposing the coherence matrix into a form of multiplying an incident electric field by a coherence structure matrix of the incident light field; obtaining an electric field near a focal field after the incident electric field passes through a tight focusing system according to the vector diffraction theory, and describing a second-order correlation characteristic of a partially coherent vector beam near a tightly focused field by using a coherence matrix; obtaining a tightly focused polarization matrix based on the tightly focused coherence matrix; and rotating the tightly focused polarization matrix into an intrinsic coordinate frame of the tightly focused polarization matrix, and calculating a three-dimensional polarimetric dimension of the partially coherent Schell-model beam in the tightly focused field.

10 Claims, 2 Drawing Sheets

METHOD FOR RAPIDLY CALCULATING THREE-DIMENSIONAL POLARIMETRIC DIMENSION, DEVICE, AND STORAGE MEDIUM

This application is the National Stage Application of PCT/CN2022/076028, filed on Feb. 11, 2022, which claims priority to Chinese Patent Application No. 202111627496.1, filed on Dec. 29, 2021, which is incorporated by reference for all purposes as if fully set forth herein.

FIELD OF THE INVENTION

The present invention relates to the field of polarimetric dimension calculation technologies, and in particular, to a method for rapidly calculating three-dimensional polarimetric dimension, a device, and a storage medium.

DESCRIPTION OF THE RELATED ART

In recent years, the rich physical properties of tightly focused vector fields have stirred up research interest. When an incident vector beam with components in only an x direction and y direction is focused by a high numerical aperture, the beam is bent toward the focal point of the high numerical aperture to produce a longitudinal z-component along an optical axis. An incident initial optical field may be decomposed into radial and angular polarization components. The radial polarization component produces a strong longitudinal component in a tight focusing process, while the angular polarization component always exhibits a transverse distribution. A tightly focused vector field is a three-dimensional polarization optical field that exhibits complex and novel physical properties in confocal microscopy, plasmon effects, optical tweezers, and optical security.

Most previous studies on tight focusing have focused on fully coherent light. The transmission of a beam is non-paraxial transmission in a tight focusing process of light. With the diffraction integral formula proposed by Richard and Wolf in 1959, the transmission is converted into the form of a Fourier transform, and rapid calculation is implemented by using software such as Matlab or Mathematica. The tightly focused polarization properties of partially coherent light have recently attracted the attention of scientists, and the properties are often used in near-field detection, single-molecule detection, particle capture, and related fields. To characterize the dimension of light more systematically, in 2017, Andreas Norrman introduced a polarimetric dimension to quantify the dimensional features of light. It was found through research that a focal field exhibits significant three-dimensional polarization properties as the coherence length of incident light decreases, and the polarimetric dimension is inextricably related to the coherence length of incident light, which plays a key role in the study of the polarization structure distribution, spin, and other aspects of the focal field.

The polarimetric dimension is an important element of the tightly focused three-dimensional polarization field of a partially coherent beam. However, the calculation of the polarimetric dimension has the problems of slow speed and low accuracy. The conventional Richard-Wolf vector diffraction theory is extended to a partially coherent beam, and a double integration in the original integral equation is changed into a quadruple integration. However, the burden of solution is increased, especially when the coherence length of an initial optical field is small, it takes more than 100 hours to calculate 512×512 data points by the quadruple integration, which greatly limits the study of the three-dimensional polarimetric dimension of the tightly focused optical field, and only a limited number of data points can be obtained within a long calculation time. In addition, when the coherence length of the initial optical field is small, the three-dimensional polarimetric dimension of the focal field obtained by the Richard-Wolf vector diffraction theory is seriously distorted. Later, in Polarimetric dimension and nonregularity of tightly focused light beams[J]. Physical Review A,2020,101(5) by Yahong Chen, Fei Wang, Zhen Dong, Yangjian Cai, Andreas Norrman, José J. Gil, Ari T. Friberg, Tero Setälä, a fully coherent decomposition method is used to calculate the three-dimensional polarimetric dimension of the tightly focused field of partially coherent radially polarized Gaussian Schell-model beams. This method shortens the calculation time to some extent. However, when the coherence length of the initial optical field is small, a large number of coherent modes are required, which occupies a large amount of running memory and calculation time, and the random phase screen expansion method makes the three-dimensional polarimetric dimension fluctuate in small ranges, and there is a certain degree of distortion. Therefore, it is particularly important to propose a method for rapidly and accurately calculating a three-dimensional polarimetric dimension.

SUMMARY OF THE INVENTION

For this, a technical problem to be resolved by the present invention is to overcome problems in the prior art, and the present invention provides a method for rapidly calculating three-dimensional polarimetric dimension, a device, and a storage medium, which can rapidly calculate the three-dimensional polarimetric dimension of the tightly focused field of partially coherent radially polarized Gaussian Schell-model beams To resolve the foregoing technical problems, the present invention provides a method for rapidly calculating a three-dimensional polarimetric dimension, including the following steps:

determining that an incident light field is a coherence matrix of a partially coherent Schell-model beam, and decomposing the coherence matrix into a form of multiplying an incident electric field by a coherence structure matrix of the incident light field;

obtaining an electric field near a focal field after the incident electric field passes through a tight focusing system according to the vector diffraction theory, and describing a second-order correlation characteristic of a partially coherent vector beam near a tightly focused field by using a coherence matrix to obtain a tightly focused coherence matrix;

obtaining a tightly focused polarization matrix based on the tightly focused coherence matrix; and rotating the tightly focused polarization matrix into an intrinsic coordinate frame of the tightly focused polarization matrix, and calculating a three-dimensional polarimetric dimension of the partially coherent Schell-model beam in the tightly focused field.

In an embodiment of the present invention, the determining that an incident light field is a coherence matrix of a partially coherent Schell-model beam, and decomposing the coherence matrix into a form of multiplying an incident electric field by a coherence structure matrix of the incident light field includes:

determining that the incident light field is the coherence matrix of the partially coherent Schell-model beam as follows:

$$W(\rho_1, \rho_2) = \tau_j^\dagger(\rho_1)u(\rho_1 - \rho_2)\tau_i(\rho_2) = \begin{pmatrix} W_{xx}(\rho_1, \rho_2) & W_{xy}(\rho_1, \rho_2) \\ W_{yx}(\rho_1, \rho_2) & W_{yy}(\rho_1, \rho_2) \end{pmatrix},$$

where $\rho=\rho(\cos\phi, \sin\phi)$ represents coordinates of any point in an incident plane, $\rho$ is a distance of an incident point with respect to an optical axis, $\phi\in(0,2\pi]$ is an azimuthal angle of the incident point with respect to the optical axis, $\tau_i(\rho)$ represents the incident electric field, † represents a matrix transpose complex conjugate, and u $(\rho_1-\rho_2)$ represents a 2×2 coherence structure matrix of an incident partially coherent Schell-model beam.

In an embodiment of the present invention, the obtaining an electric field near a focal field after the incident electric field passes through a tight focusing system according to the vector diffraction theory includes:

in the tight focusing system with a high numerical aperture lens, determining that a relationship existing between the incident electric field $\tau_i(\rho)$ and an electric field $\tau_0(\rho)$ that is closed to a rear surface of the high numerical aperture lens is $\tau_0(\rho)=\tau_i(\rho)N(\rho)$, where $N(\rho)$ is a coordinate conversion matrix; and obtaining an electric field $$\tau(r, z) = -\frac{if}{\lambda}\int_0^\alpha \int_0^{2\pi} P(\theta)D(\rho)\tau_0(\rho)e^{iksin\theta(x\cos\phi+y\sin\phi)}e^{-ikz\cos\theta}\sin\theta d\theta d\phi$$

near the focal field after the incident electric field passes through the tight focusing system according to the electric field $\tau_0(\rho)$ that is closed to the rear surface of high numerical aperture lens, where r=(x, y) is the transverse coordinates of an observation point near the focal field, z is a longitudinal distance between the observation point and a focal point, $\tau(r, z)$ represents the electric field near the focal field, i is an imaginary number unit, $$k = \frac{2\pi n_t}{\lambda}$$

is a wave number of incident light, $n_t$ is a refractive index of a surrounding medium, $\lambda$ is a wavelength of the incident light, $\theta\in[0, \alpha]$ is an angle between a connecting line between the incident point and the focal point and the optical axis, $$\alpha = \arcsin\frac{NA}{n_t}$$

is a maximum convergence angle of a lens, NA is a numerical aperture of the lens, D $(\rho)$ is an aperture function, and $P(\theta)=\sqrt{\cos\theta}$ is an apodization function at an aperture.

In an embodiment of the present invention, describing the second-order correlation characteristics of the partially coherent vector beam near the tight focusing field by using the coherence matrix includes:

describing the second-order correlation characteristics of the partially coherent vector beam near the tight focusing field by using the coherence matrix, $$\Phi(r_1, r_2, z) = \langle \tau^\dagger(r_1, z)\tau(r_2, z)\rangle = \begin{pmatrix} \Phi_{11}(r_1, r_2, z) & \Phi_{12}(r_1, r_2, z) & \Phi_{13}(r_1, r_2, z) \\ \Phi_{21}(r_1, r_2, z) & \Phi_{22}(r_1, r_2, z) & \Phi_{23}(r_1, r_2, z) \\ \Phi_{31}(r_1, r_2, z) & \Phi_{32}(r_1, r_2, z) & \Phi_{33}(r_1, r_2, z) \end{pmatrix},$$

where $\langle\rangle$ represents ensemble average;

$$\Phi(r_1, r_2, z) = \frac{1}{f^2\lambda^2}\int\int \frac{D(\rho_1)D(\rho_2)}{\sqrt{\cos\theta_1}\sqrt{\cos\theta_2}}N^\dagger(\rho_1)W(\rho_1, \rho_2)N(\rho_2)$$

obtaining $$\times\exp\left[-ik\left(\rho_1\cdot\frac{r_1}{f} - \rho_2\cdot\frac{r_2}{f}\right)\right]\exp[ikz(\cos\theta_1 - \cos\theta_2)]d^2\rho_1 d^2\rho_2$$

according to the formula of the coherence matrix of the incident light field, the relational expression between the incident electric field $\tau_i(\rho)$ and the electric field $\tau_0(\rho)$ that is closed to the rear surface of the high numerical aperture lens, and the formula of the tightly focused electric field, and obtaining a coherence matrix element of the tightly focused field through arrangement as follows:

$$\Phi_{ij}(r_1, r_2, z) = \frac{1}{f^2\lambda^2}\int\int \frac{D(\rho_1)D(\rho_2)}{\sqrt{\cos\theta_1}\sqrt{\cos\theta_2}}$$

$$\times [N_{1j}(\rho_2)N_{i1}^*(\rho_1)W_{xx}(\rho_1, \rho_2)$$

$$+N_{2j}(\rho_2)N_{i2}^*(\rho_1)W_{yy}(\rho_1, \rho_2)$$

$$+N_{2j}(\rho_2)N_{i1}^*(\rho_1)W_{xy}(\rho_1, \rho_2)$$

$$+N_{1j}(\rho_2)N_{i2}^*(\rho_1)W_{yx}(\rho_1, \rho_2)]$$

$$\times\exp\left[-ik\left(\rho_1\cdot\frac{r_1}{f} - \rho\cdot\frac{r_2}{f}\right)\right]\exp[ikz(\cos\theta_1 - \cos\theta_2)]d^2\rho_1 d^2\rho_2, (i, j = 1, 2, 3)$$

In an embodiment of the present invention, obtaining a tightly focused polarization matrix based on the tightly focused coherence matrix includes:

introducing a new coordinate expression and a Fourier transform according to a nonnegative definition condition, simplifying a matrix element of the tightly focused coherence matrix into a form of a convolution operation of two functions, obtaining a matrix element of the tightly focused polarization matrix, and obtaining the tightly focused polarization matrix based on the matrix element of the tightly focused polarization matrix.

In an embodiment of the present invention, the introducing a new coordinate expression and a Fourier transform according to a nonnegative definition condition, simplifying a matrix element of the tightly focused coherence matrix into a form of a convolution operation of two functions, obtaining a matrix element of the tightly focused polarization matrix, and obtaining the tightly focused polarization matrix based on the matrix element of the tightly focused polarization matrix includes:

obtaining a coherence matrix element $$\Phi_{ij}(r_1, r_2, z) = \frac{1}{f^2\lambda^2} \iiint$$
$$\times \{A_{1j}(\rho_2, z)B^*_{i1}(\rho_1, z)p_{xx}(v)\exp[ik(\rho_1-\rho_2)\cdot v]$$
$$+A_{2j}(\rho_2, z)B^*_{i2}(\rho_1, z)p_{yy}(v)\exp[ik(\rho_1-\rho_2)\cdot v]$$
$$+A_{2j}(\rho_2, z)B^*_{i1}(\rho_1, z)p_{xy}(v)\exp[ik(\rho_1-\rho_2)\cdot v]$$
$$+A_{1j}(\rho_2, z)B^*_{i2}(\rho_1, z)p_{yx}(v)\exp[ik(\rho_1-\rho_2)\cdot v]\}d^2v$$
$$\times \exp\left[-ik\left(\rho_1\cdot\frac{r_1}{f}-\rho_2\cdot\frac{r_2}{f}\right)\right]d^2\rho_1 d^2\rho_2, (i, j = 1, 2, 3)$$

of the tightly focused field according to the given nonnegative definition condition, where $A_{\eta j}(\eta=1,2; j=1,2,3)$ is an element in a matrix A, $B_{i\zeta}(i=1,2,3; \zeta=1,2)$ is an element in a matrix B, the matrix A and the matrix B are $$\begin{cases} A(\rho_2, z) = \frac{e^{-ikz\cos\theta_2}D(\rho_2)}{\sqrt{\cos\theta_2}}\tau_i(\rho_2)N(\rho_2) \\ B(\rho_1, z) = \frac{e^{-ikz\cos\theta_1}D(\rho_1)}{\sqrt{\cos\theta_1}}N^T(\rho_1)\tau_i^T(\rho_1) \end{cases},$$

and T represents a matrix transpose;

$$\rho_s = \frac{\rho_1+\rho_2}{2}, \rho_d = \rho_1-\rho_2$$
$$r_s = \frac{r_1+r_2}{2}, r_d = r_1-r_2$$

introducing a new coordinate expression and converting the coherence matrix element of the tightly focused field into $$\Phi_{ij}(r_1, r_2, z) = \frac{1}{f^2\lambda^4}\int$$
$$\left[\tilde{A}_{1j}\left(\frac{u_1}{\lambda}, z\right)\tilde{B}^*_{i1}\left(\frac{u_1-\frac{r_d}{f}}{\lambda}, z\right)\tilde{u}_{xx}\left(\frac{-\frac{r_s}{f}+\frac{r_d}{2f}-u_1}{\lambda}\right)\right.$$
$$+\tilde{A}_{2j}\left(\frac{u_1}{\lambda}, z\right)\tilde{B}^*_{i2}\left(\frac{u_1-\frac{r_d}{f}}{\lambda}, z\right)\tilde{u}_{yy}\left(\frac{-\frac{r_s}{f}+\frac{r_d}{2f}-u_1}{\lambda}\right)$$
$$+\tilde{A}_{2j}\left(\frac{u_1}{\lambda}, z\right)\tilde{B}^*_{i1}\left(\frac{u_1-\frac{r_d}{f}}{\lambda}, z\right)\tilde{u}_{xy}\left(\frac{-\frac{r_s}{f}+\frac{r_d}{2f}-u_1}{\lambda}\right)$$
$$\left.+\tilde{A}_{1j}\left(\frac{u_1}{\lambda}, z\right)\tilde{B}^*_{i2}\left(\frac{u_1-\frac{r_d}{f}}{\lambda}, z\right)\tilde{u}_{yx}\left(\frac{-\frac{r_s}{f}+\frac{r_d}{2f}-u_1}{\lambda}\right)\right]d^2u_1, (i, j = 1, 2, 3)$$

where $\tilde{A}_{\zeta j}$ represents a Fourier transform of an element $A_{\zeta j}$, $\tilde{B}_{\zeta j}$ represents a Fourier transform of an element $B_{\zeta j}$, * represents a conjugate, $u_{\alpha\beta}(\alpha,\beta=x,y)$ is an element in the coherence structure matrix u, and $\tilde{u}_{\alpha\beta}$ represents a Fourier transform of the element $u_{\alpha\beta}$;

letting $r_1=r_2=r$, and writing the coherence matrix element as a polarization matrix element $$\Phi_{ij}(r, z) = \frac{1}{f^2\lambda^2}\left\{\left[\tilde{A}_{1j}\left(\frac{-r}{f\lambda}, z\right)\tilde{B}^*_{i1}\left(\frac{-r}{f\lambda}, z\right)\right]\otimes\tilde{u}_{xx}\left(\frac{-r}{f\lambda}\right)\right.$$
$$+\left[\tilde{A}_{2j}\left(\frac{-r}{f\lambda}, z\right)\tilde{B}^*_{i2}\left(\frac{-r}{f\lambda}, z\right)\right]\otimes\tilde{u}_{yy}\left(\frac{-r}{f\lambda}\right)$$
$$+\left[\tilde{A}_{2j}\left(\frac{-r}{f\lambda}, z\right)\tilde{B}^*_{i1}\left(\frac{-r}{f\lambda}, z\right)\right]\otimes\tilde{u}_{xy}\left(\frac{-r}{f\lambda}\right)$$
$$\left.+\left[\tilde{A}_{1j}\left(\frac{-r}{f\lambda}, z\right)\tilde{B}^*_{i2}\left(\frac{-r}{f\lambda}, z\right)\right]\otimes\tilde{u}_{yx}\left(\frac{-r}{f\lambda}\right)\right\}, (i, j = 1, 2, 3)$$

where $\otimes$ represents a convolution operation; and substituting the converted formula of the coherence matrix element into the formula of the polarization matrix element to obtain the tightly focused polarization matrix.

In an embodiment of the present invention, the rotating the tightly focused polarization matrix into an intrinsic coordinate frame of the tightly focused polarization matrix, and calculating a three-dimensional polarimetric dimension of the partially coherent Schell-model beam in the tightly focused field includes:

rotating the tightly focused polarization matrix into the intrinsic coordinate frame of the tightly focused polarization matrix by using a three-dimensional spin matrix, obtaining a real part and an imaginary part of the tightly focused polarization matrix, solving an eigenvalue of the real part, and calculating the three-dimensional polarimetric dimension of the partially coherent Schell-model beam in the tightly focused field.

In an embodiment of the present invention, a calculation formula of the three-dimensional polarimetric dimension is $$D = 3 - \frac{\sqrt{2[(a_1-a_2)^2+(a_1-a_3)^2+(a_2-a_3)^2]}}{a_1+a_2+a_3},$$

where $\alpha_1 \geq \alpha_2 \geq \alpha_3 \geq 0$ are the eigenvalue of the real part of the polarization matrix $\Phi(r,z)$.

In addition, the present invention further provides a computer device, including a memory, a processor, and a computer program stored in the memory and configured to be executed by the processor, where the processor is configured to execute the program to implement the steps in the foregoing method.

In addition, the present invention further provides a computer-readable storage medium, storing a computer program, where a processor is configured to execute the program to implement the steps in the method according to any one of claims 1 to 8.

Compared with the prior art, the foregoing technical solution of the present invention has the following advantages:

1. The present invention proposes to use calculations such as a nonnegative definition condition, a coordinate replacement, a Fourier transform, and a convolution operation to simplify a tightly focused polarization matrix of a partially coherent Schell-model beam into a convolutional form that can be rapidly processed by the software Matlab, so that a three-dimensional polarimetric dimension of the partially coherent Schell-model beam can be efficiently solved, and the time consumption is greatly reduced. In the present invention, it takes only about 1.8 seconds to calculate a three-dimensional polarimetric dimension of 512×512 data points.

The present invention can implement the flexible regulation of the coherence length of an incident partially coherent Schell-model beam and causing nearly no impact on the calculation time and image precision, thereby facilitating the exploration and application of three-dimensional polarization characteristics of a beam with a complex structure.

BRIEF DESCRIPTION OF THE DRAWINGS

To make the content of the present invention clearer and more comprehensible, the present invention is further described in detail below according to specific embodiments of the present invention and the accompanying drawings.

Figure 1:
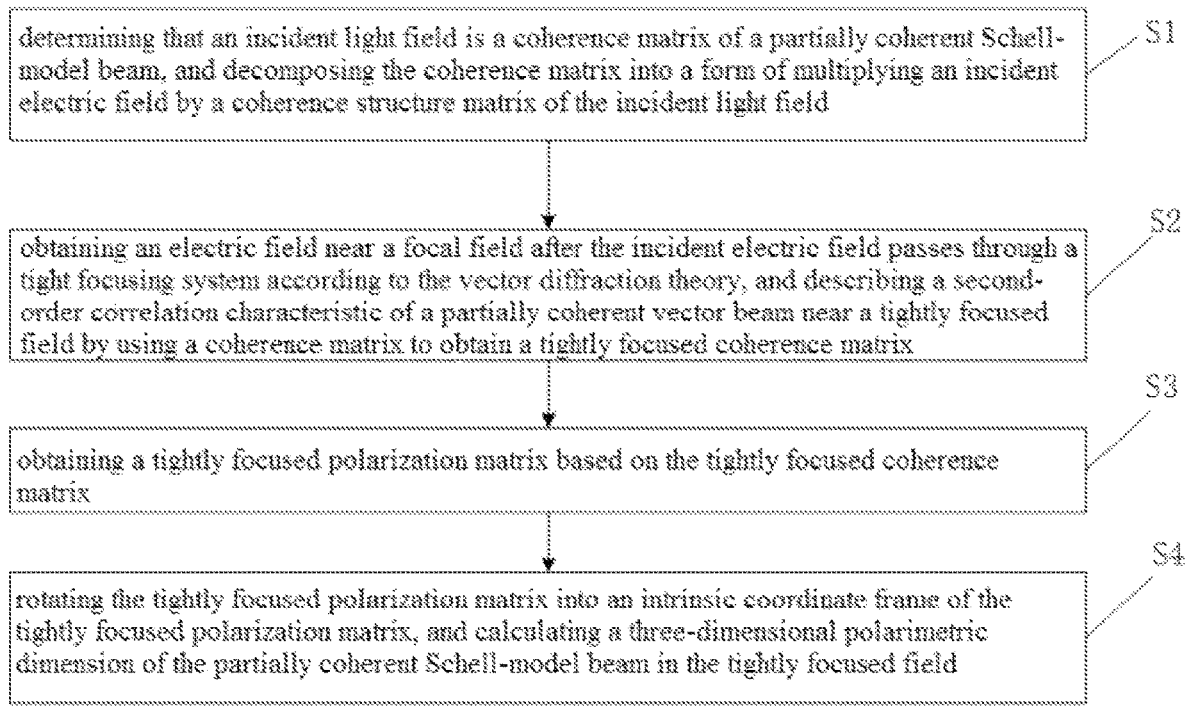
FIG. 1 is a schematic flowchart of a method for rapidly calculating a three-dimensional polarimetric dimension according to the present invention.

Reference numerals are described as follows: 10. processor; 11. memory; 12. communication interface; and 13. communication bus.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

Referring to FIG. 1, embodiments of the present invention provide a method for rapidly calculating a three-dimensional polarimetric dimension, including the following steps:

S1: Determine that an incident light field is a coherence matrix of a partially coherent Schell-model beam, and decompose the coherence matrix into a form of multiplying an incident electric field by a coherence structure matrix of the incident light field.

S2: Obtain an electric field near a focal field after the incident electric field passes through a tight focusing system according to the vector diffraction theory, and describe a second-order correlation characteristic of a partially coherent vector beam near a tightly focused field by using a coherence matrix to obtain a tightly focused coherence matrix.

S3: Obtain a tightly focused polarization matrix based on the tightly focused coherence matrix.

S4: Rotate the tightly focused polarization matrix into an intrinsic coordinate frame of the tightly focused polarization matrix, and calculate a three-dimensional polarimetric dimension of the partially coherent Schell-model beam in the tightly focused field.

In the method for rapidly calculating a three-dimensional polarimetric dimension disclosed in the present invention, the present invention proposes to use calculations such as a nonnegative definition condition, a coordinate replacement, a Fourier transform, and a convolution operation to simplify a tightly focused polarization matrix of a partially coherent Schell-model beam into a convolutional form that can be rapidly processed by the software Matlab, so that a three-dimensional polarimetric dimension of the partially coherent Schell-model beam can be efficiently solved, and the time consumption is greatly reduced. In the present invention, it takes only about 1.8 seconds to calculate a three-dimensional polarimetric dimension of 512×512 data points.

In the method for rapidly calculating a three-dimensional polarimetric dimension disclosed in the present invention, S1 of determining that an incident light field is a coherence matrix of a partially coherent Schell-model beam, and decomposing the coherence matrix into a form of multiplying an incident electric field by a coherence structure matrix of the incident light field in the foregoing embodiment includes:

determining that the incident light field is the coherence matrix of the partially coherent Schell-model beam as follows:

$$W(\rho_1, \rho_2) = \tau_i^\dagger(\rho_1)u(\rho_1 - \rho_2)\tau_i(\rho_2) = \begin{pmatrix} W_{xx}(\rho_1, \rho_2) & W_{xy}(\rho_1, \rho_2) \\ W_{yx}(\rho_1, \rho_2) & W_{yy}(\rho_1, \rho_2) \end{pmatrix}, \quad (1)$$

where $\rho=\rho(\cos\phi, \sin\phi)$ represents coordinates of any point in an incident plane, $\rho$ is a distance of an incident point with respect to an optical axis, $\phi\in(0, 2\pi]$ is an azimuthal angle of the incident point with respect to the optical axis, $\tau_i(\rho)$ represents the incident electric field, † represents a matrix transpose complex conjugate, and $u(\rho_1-\rho_2)$ represents a 2×2 coherence structure matrix of an incident partially coherent Schell-model beam, which is:

$$u(\rho_1 - \rho_2) = \begin{pmatrix} u_{xx}(\rho_1 - \rho_2) & u_{xy}(\rho_1 - \rho_2) \\ u_{yx}(\rho_1 - \rho_2) & u_{yy}(\rho_1 - \rho_2) \end{pmatrix}. \quad (2)$$

In the method for rapidly calculating a three-dimensional polarimetric dimension disclosed in the present invention, S2 of obtaining an electric field near a focal field after the incident electric field passes through a tight focusing system according to the vector diffraction theory, and describe a second-order correlation characteristic of a partially coherent vector beam near a tightly focused field by using a coherence matrix in the foregoing embodiment includes:

S2.1: in the tight focusing system with a high numerical aperture lens, determining that a relationship existing between the incident electric field $\tau_i(\rho)$ and an electric field $\tau_0$ ($\rho$) that is closed to a rear surface of a high numerical aperture lens is as follows:

$$\tau_0(\rho) = \tau_i(\rho)N(\rho) \qquad (3), \text{and}$$

using a conversion relationship between coordinates:

$$\begin{cases} e_\theta = \cos\phi e_x + \sin\phi e_y \\ e_\phi = -\sin\phi e_x + \cos\phi e_y \\ e'_\theta = \cos\phi\cos\theta e_x + \sin\phi\cos\theta e_y + \sin\theta e_z \end{cases}, \qquad (4)$$

where $e_x$ and $e_y$ respectively represent unit vectors in an x direction and a y direction in a Cartesian coordinate system, $e_\theta$ and $e_\phi$ respectively represent unit vectors in a polar coordinate system, $e'_\theta$ and $e_\phi$ respectively represent unit vectors in a spherical coordinate system with the focal point as the center of sphere in the tight focusing system, and a 2×3 coordinate conversion matrix $N(\rho)$ is obtained by using Formulas (3) and (4):

$$N(\rho) = \begin{pmatrix} N_{11}(\rho) & N_{12}(\rho) & N_{13}(\rho) \\ N_{21}(\rho) & N_{22}(\rho) & N_{23}(\rho) \end{pmatrix} \qquad (5)$$

$$= \begin{pmatrix} \sin^2\phi + \cos^2\phi\cos\theta & \sin\phi\cos\phi(\cos\theta - 1) & \sin\theta\cos\phi \\ \sin\phi\cos\phi(\cos\theta - 1) & \cos^2\phi + \sin^2\phi\cos\theta & \sin\theta\sin\phi \end{pmatrix};$$

S2.2: according to the Richard-Wolf vector diffraction theory, obtaining an electric field near a focal field after the incident electric field passes through a tight focusing system, which may be represented as:

$$\tau(r, z) = -\frac{if}{\lambda} \int_0^\alpha \int_0^{2\pi} P(\theta)D(\rho)\tau_0(\rho)e^{ik\sin\theta(x\cos\phi + y\sin\phi)}e^{-ikz\cos\theta}\sin\theta d\theta d\phi, \qquad (6)$$

where r=(x, y) is the transverse coordinates of an observation point near the focal field, z is a longitudinal distance between the observation point and a focal point, $\tau$(r,z) represents the electric field near the focal field, i is an imaginary number unit, $$k = \frac{2\pi n_t}{\lambda}$$

is a wave number of incident light, $n_t$ is a refractive index of a surrounding medium, $\lambda$ is a wavelength of the incident light, $\theta \in [0, \alpha]$ is an angle between a connecting line between the incident point and the focal point and the optical axis, $$\alpha = \arcsin\frac{NA}{n_t}$$

is a maximum convergence angle of a lens, NA is a numerical aperture of the lens, $D(\rho)$ is an aperture function and is determined by the parameters of the lens, and $P(\theta)=\sqrt{\cos\theta}$ is an apodization function at an aperture;

S2.3: describing the second-order correlation characteristics of the partially coherent vector beam near the tight focusing field by using the 3×3 coherence matrix:

$$\Phi(r_1, r_2, z) = \qquad (7)$$

$$\langle \tau^+(r_1, z)\tau(r_2, z) \rangle = \begin{pmatrix} \Phi_{11}(r_1, r_2, z) & \Phi_{12}(r_1, r_2, z) & \Phi_{13}(r_1, r_2, z) \\ \Phi_{21}(r_1, r_2, z) & \Phi_{22}(r_1, r_2, z) & \Phi_{23}(r_1, r_2, z) \\ \Phi_{31}(r_1, r_2, z) & \Phi_{32}(r_1, r_2, z) & \Phi_{33}(r_1, r_2, z) \end{pmatrix},$$

where $\langle \rangle$ represents ensemble average;

the following is obtained according to Formula (1), Formula (3), and Formula (6):

$$\Phi(r_1, r_2, z) = \frac{1}{f^2\lambda^2} \int\int \frac{D(\rho_1)D(\rho_2)}{\sqrt{\cos\theta_1}\sqrt{\cos\theta_2}} N^+(\rho_1)W(\rho_1, \rho_2)N(\rho_2) \times \qquad (8)$$

$$\exp\left[-ik\left(\rho_1 \cdot \frac{r_1}{f} - \rho_2 \cdot \frac{r_2}{f}\right)\right]\exp[ikz(\cos\theta_1 - \cos\theta_2)]d^2\rho_1 d^2\rho_2,$$

and obtaining a coherence matrix element of the tightly focused field through arrangement as follows:

$$\Phi_{ij}(r_1, r_2, z) = \frac{1}{f^2\lambda^2} \int\int \frac{D(\rho_1)D(\rho_2)}{\sqrt{\cos\theta_1}\sqrt{\cos\theta_2}} \qquad (9)$$

$$\times [N_{1j}(\rho_2)N_{i1}^*(\rho_1)W_{xx}(\rho_1, \rho_2)$$
$$+N_{2j}(\rho_2)N_{i2}^*(\rho_1)W_{yy}(\rho_1, \rho_2)$$
$$+N_{2j}(\rho_2)N_{i1}^*(\rho_1)W_{xy}(\rho_1, \rho_2)$$
$$+N_{1j}(\rho_2)N_{i2}^*(\rho_1)W_{yx}(\rho_1, \rho_2)]$$

$$\times \exp\left[-ik\left(\rho_1 \cdot \frac{r_1}{f} - \rho_2 \cdot \frac{r_2}{f}\right)\right]\exp[ikz(\cos\theta_1 - \cos\theta_2)]d^2\rho_1 d^2\rho_2, \ (i, j = 1, 2, 3)$$

In the method for rapidly calculating a three-dimensional polarimetric dimension disclosed in the present invention, S3 of obtaining a tightly focused polarization matrix based on the tightly focused coherence matrix in the foregoing embodiment includes:

S3.1: it is known that matrix elements of a 2×2 coherence matrix of an incident partially coherent beam satisfy the nonnegative definition condition:

$$W_{\alpha\beta}(\rho_1,\rho_2) = \int P_{\alpha\beta}(v)H_\alpha^*(\rho_1, v) H_\beta(\rho_2,v) \ d^2v, \ (\alpha, \beta = x, y) \qquad (10),$$

where $H_x$ and $H_y$ are any functions, and are represented in the form of a Fourier transform:

$$\begin{cases} H_x(\rho, v) = \tau_{ix}(\rho)\exp(-ik\rho \cdot v) \\ H_y(\rho, v) = \tau_{iy}(\rho)\exp(-ik\rho \cdot v) \end{cases}, \qquad (11)$$

$P_{\alpha\beta}(v) \geq 0$ is a matrix element of a weighting matrix:

$$p(v) = \begin{pmatrix} p_{xx}(v) & p_{xy}(v) \\ p_{yx}(v) & p_{yy}(v) \end{pmatrix}, \quad (12)$$

for ease of calculation, letting $$\begin{cases} A(\rho_2, z) = \dfrac{e^{-ikz\cos\theta_2} D(\rho_2)}{\sqrt{\cos\theta_2}} \tau_i(\rho_2) N(\rho_2) \\ B(\rho_1, z) = \dfrac{e^{-ikz\cos\theta_1} D(\rho_1)}{\sqrt{\cos\theta_1}} N^T(\rho_1) \tau_i^T(\rho_1) \end{cases}, \quad (13)$$

where T represents a matrix transpose; and according to Formulas (10) to (13), a coherence matrix element of the tightly focused field is obtained as follows:

$$\Phi_{ij}(r_1, r_2, z) = \frac{1}{f^2\lambda^2} \iiint \quad (14)$$
$$\times \{A_{1j}(\rho_2, z) B_{i1}^*(\rho_1, z) p_{xx}(v) \exp[ik(\rho_1 - \rho_2) \cdot v]$$
$$+ A_{2j}(\rho_2, z) B_{i2}^*(\rho_1, z) p_{yy}(v) \exp[ik(\rho_1 - \rho_2) \cdot v]$$
$$+ A_{2j}(\rho_2, z) B_{i1}^*(\rho_1, z) p_{xy}(v) \exp[ik(\rho_1 - \rho_2) \cdot v]$$
$$+ A_{1j}(\rho_2, z) B_{i2}^*(\rho_1, z) p_{yx}(v) \exp[ik(\rho_1 - \rho_2) \cdot v]\} d^2 v$$
$$\times \exp\left[-ik\left(\rho_1 \cdot \frac{r_1}{f} - \rho_2 \cdot \frac{r_2}{f}\right)\right] d^2\rho_1 d^2\rho_2, \ (i, j = 1, 2, 3)$$

where $A_{\eta j}(\eta=1,2;\ j=1,2,3)$ is an element in a matrix A, and $B_{i\zeta}(i=1,2,3;\ \zeta=1,2)$ is an element in a matrix B;

S3.2: introducing a new coordinate expression form:

$$\rho_s = \frac{\rho_1 + \rho_2}{2}, \ \rho_d = \rho_1 - \rho_2 \quad (15)$$
$$r_s = \frac{r_1 + r_2}{2}, \ r_d = r_1 - r_2$$

Formula (14) may be represented as:

$$\Phi_{ij}(r_1, r_2, z) = \frac{1}{f^2\lambda^4} \int \quad (16)$$
$$\left[ \tilde{A}_{1j}\!\left(\frac{u_1}{\lambda}, z\right)\tilde{B}_{i1}^*\!\left(\frac{u_1 - \frac{r_d}{f}}{\lambda}, z\right) \tilde{u}_{xx}\!\left(\frac{-\frac{r_s}{f} + \frac{r_d}{2f} - u_1}{\lambda}\right) \right.$$
$$+ \tilde{A}_{2j}\!\left(\frac{u_1}{\lambda}, z\right)\tilde{B}_{i2}^*\!\left(\frac{u_1 - \frac{r_d}{f}}{\lambda}, z\right) \tilde{u}_{yy}\!\left(\frac{-\frac{r_s}{f} + \frac{r_d}{2f} - u_1}{\lambda}\right)$$
$$+ \tilde{A}_{2j}\!\left(\frac{u_1}{\lambda}, z\right)\tilde{B}_{i1}^*\!\left(\frac{u_1 - \frac{r_d}{f}}{\lambda}, z\right) \tilde{u}_{xy}\!\left(\frac{-\frac{r_s}{f} + \frac{r_d}{2f} - u_1}{\lambda}\right)$$
$$\left. + \tilde{A}_{1j}\!\left(\frac{u_1}{\lambda}, z\right)\tilde{B}_{i2}^*\!\left(\frac{u_1 - \frac{r_d}{f}}{\lambda}, z\right) \tilde{u}_{yx}\!\left(\frac{-\frac{r_s}{f} + \frac{r_d}{2f} - u_1}{\lambda}\right) \right] d^2 u_1, \ (i, j = 1, 2, 3)$$

where $\tilde{A}_{\eta j}$ represents a Fourier transform of an element $A_{\eta j}$, $\tilde{B}_{\eta j}$ represents a Fourier transform of an element $B_{\eta j}$, * represents a conjugate, $u_{\alpha\beta}(\alpha,\beta=x,y)$ is an element in the coherence structure matrix u, and $\tilde{u}_{\alpha\beta}$ represents a Fourier transform of the element $u_{\alpha\beta}$;

S3.3: letting $r_1 = r_2 = r$, and writing the coherence matrix element as a polarization matrix element:

$$\Phi_{ij}(r, z) = \frac{1}{f^2\lambda^2}\left\{\left[\tilde{A}_{1j}\!\left(\frac{-r}{f\lambda}, z\right)\tilde{B}_{i1}^*\!\left(\frac{-r}{f\lambda}, z\right)\right] \otimes \tilde{u}_{xx}\!\left(\frac{-r}{f\lambda}\right) \right. \quad (17)$$
$$+ \left[\tilde{A}_{2j}\!\left(\frac{-r}{f\lambda}, z\right)\tilde{B}_{i2}^*\!\left(\frac{-r}{f\lambda}, z\right)\right] \otimes \tilde{u}_{yy}\!\left(\frac{-r}{f\lambda}\right)$$
$$+ \left[\tilde{A}_{2j}\!\left(\frac{-r}{f\lambda}, z\right)\tilde{B}_{i1}^*\!\left(\frac{-r}{f\lambda}, z\right)\right] \otimes \tilde{u}_{xy}\!\left(\frac{-r}{f\lambda}\right)$$
$$\left. + \left[\tilde{A}_{1j}\!\left(\frac{-r}{f\lambda}, z\right)\tilde{B}_{i2}^*\!\left(\frac{-r}{f\lambda}, z\right)\right] \otimes \tilde{u}_{yx}\!\left(\frac{-r}{f\lambda}\right) \right\}, \ (i, j = 1, 2, 3)$$

where $\otimes$ represents a convolution operation; and

S3.4: substituting Formula (16) into Formula (17), so that a polarization matrix of the partially coherent Schell-model beam near the tightly focused field may be obtained as follows:

$$\Phi(r, z) = \begin{pmatrix} \Phi_{11}(r, z) & \Phi_{12}(r, z) & \Phi_{13}(r, z) \\ \Phi_{21}(r, z) & \Phi_{22}(r, z) & \Phi_{23}(r, z) \\ \Phi_{31}(r, z) & \Phi_{32}(r, z) & \Phi_{33}(r, z) \end{pmatrix}. \quad (18)$$

In the method for rapidly calculating a three-dimensional polarimetric dimension disclosed in the present invention, S4 of rotating the tightly focused polarization matrix into an intrinsic coordinate frame of the tightly focused polarization matrix, and calculating a three-dimensional polarimetric dimension of the partially coherent Schell-model beam in the tightly focused field in the foregoing embodiment includes:

S4.1: rotating the polarization matrix into the intrinsic coordinate frame of the polarization matrix by using a three-dimensional spin matrix $Q_0$ of $3\times3$:

$$\Phi_0(r, z) = Q_0^T \Phi(r, z) Q_0 = \begin{pmatrix} a_1 & 0 & 0 \\ 0 & a_2 & 0 \\ 0 & 0 & a_3 \end{pmatrix} + i\begin{pmatrix} 0 & -n_3 & n_2 \\ n_3 & 0 & -n_1 \\ -n_2 & n_1 & 0 \end{pmatrix}, \quad (19)$$

where $\alpha_1 \geq \alpha_2 \geq \alpha_3 \geq 0$ is the eigenvalue of the real part of the polarization matrix $\Phi(r, z)$, and $n=(n_1, n_2, n_3)$ is an angular momentum vector; and S4.2: calculating a three-dimensional polarimetric dimension of the partially coherent Schell-model beam in the tightly focused field as follows:

$$D = 3 - \frac{\sqrt{2[(a_1 - a_2)^2 + (a_1 - a_3)^2 + (a_2 - a_3)^2]}}{a_1 + a_2 + a_3}. \quad (20)$$

In the method for rapidly calculating a three-dimensional polarimetric dimension disclosed in the present invention, the present invention can implement the flexible regulation of the coherence length of an incident partially coherent Schell-model beam and causing nearly no impact on the calculation time and image precision, thereby facilitating the exploration and application of three-dimensional polarization characteristics of a beam with a complex structure.

Corresponding to the foregoing method embodiments, the embodiments of the present invention further provide a computer device, including:

a memory, configured to store a computer program; and a processor, configured to implement, when executing the computer program, the steps of the foregoing method for rapidly calculating a three-dimensional polarimetric dimension.

Figure 2:
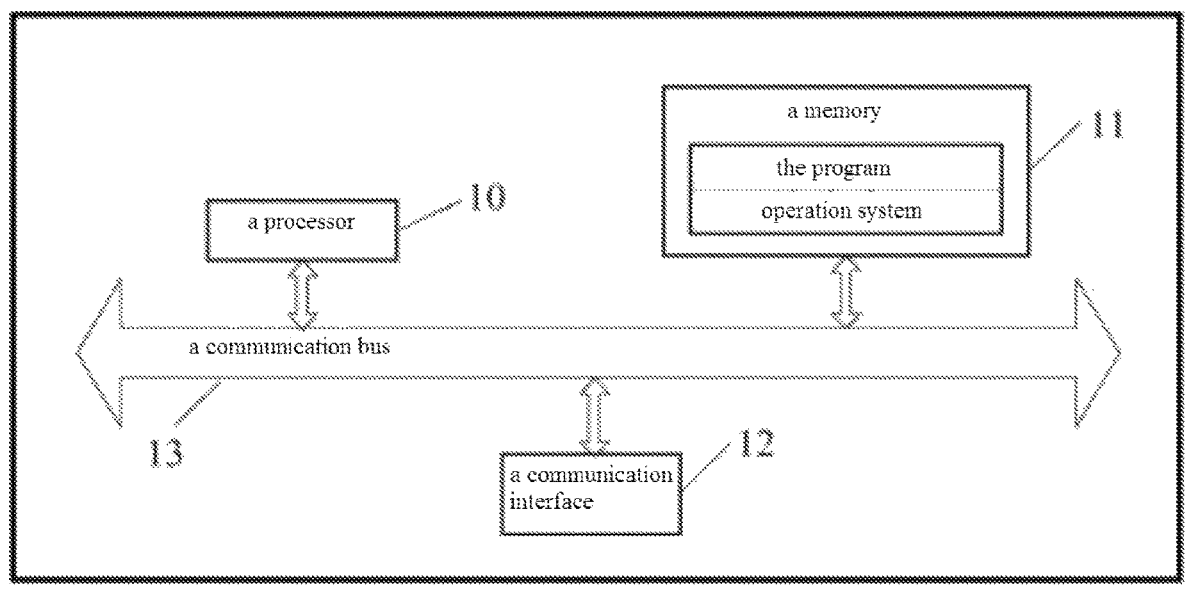
FIG. 2 is a schematic diagram of a hardware structure of a computer device according to the present invention.

FIG. 2 is a schematic structural diagram of the computer device. The computer device may include a processor 10, a memory 11, a communication interface 12, and a communication bus 13. The processor 10, the memory 11, and the communication interface 12 implement communication with each other through the communication bus 13.

In the embodiments of the present invention, the processor 10 may be a central processing unit (CPU), an application specific integrated circuit, a digital signal processor, a field programmable gate array, another programmable logic device or the like.

The processor 10 may invoke a program stored in the memory 11. Specifically, the processor 10 may perform the operations in the embodiments of the method for rapidly calculating a three-dimensional polarimetric dimension.

The memory 11 is configured to store one or more programs. The program may include program code. The program code includes computer operation instructions.

Moreover, the storage 11 may include a high-speed random access memory (RAM), and may further include a non-volatile storage, for example, at least one magnetic disk storage device, or other volatile solid state storage device.

The communication interface 12 may be an interface of the communication module, and is configured to connect to another device or system.

Certainly, it needs to be noted that the structure shown in FIG. 5 does not constitute a limitation to the computer device in the embodiments of the present application. During actual application, the computer device may include more or fewer components than those shown in FIG. 5, or some components may be combined.

Corresponding to the foregoing method embodiments, the embodiments of the present invention further provides a computer-readable storage medium. The computer-readable storage medium stores a computer program. The computer program implements, when being executed by the processor, the steps in the foregoing method for rapidly calculating a three-dimensional polarimetric dimension.

A person skilled in the art should understand that the embodiments of the present application may be provided as a method, a system or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, the foregoing embodiments are merely examples for clear description, rather than a limitation to implementations. For a person of ordinary skill in the art, other changes or variations in different forms may also be made based on the foregoing description. All implementations cannot and do not need to be exhaustively listed herein. Obvious changes or variations that are derived there from still fall within the protection scope of the invention of the present invention.

What is claimed is:

1. A method for rapidly calculating a three-dimensional polarimetric dimension, comprising steps of:

determining that an incident light field is a coherence matrix of a partially coherent Schell-model beam, and decomposing the coherence matrix into a form of multiplying an incident electric field by a coherence structure matrix of the incident light field;

obtaining an electric field near a focal field after the incident electric field passes through a tight focusing system according to the vector diffraction theory, and describing a second-order correlation characteristic of a partially coherent vector beam near a tightly focused field by using a coherence matrix to obtain a tightly focused coherence matrix;

obtaining a tightly focused polarization matrix based on the tightly focused coherence matrix; and rotating the tightly focused polarization matrix into an intrinsic coordinate frame of the tightly focused polarization matrix, and calculating a three-dimensional polarimetric dimension of the partially coherent Schell-model beam in the tightly focused field.

2. The method for rapidly calculating a three-dimensional polarimetric dimension according to claim 1, wherein the determining that an incident light field is a coherence matrix of a partially coherent Schell-model beam, and decomposing the coherence matrix into a form of multiplying an incident electric field by a coherence structure matrix of the incident light field comprises:

determining that the incident light field is the coherence matrix of the partially coherent Schell-model beam as follows:

$$W(\rho_1, \rho_2) = \tau_i^\dagger(\rho_1)u(\rho_1 - \rho_2)\tau_i(\rho_2) = \begin{pmatrix} W_{xx}(\rho_l, \rho_2) & W_{xy}(\rho_l, \rho_2) \\ W_{yx}(\rho_l, \rho_2) & W_{yy}(\rho_l, \rho_2) \end{pmatrix},$$

where $\rho=\rho(\cos\phi, \sin\phi)$ represents coordinates of any point in an incident plane, $\rho$ is a distance of an incident point with respect to an optical axis, $\phi\in(0, 2\pi]$ is an azimuthal angle of the incident point with respect to the optical axis, $\tau_i(\rho)$ represents the incident electric field, † represents a matrix transpose complex conjugate, and u $(\rho_1-\rho_2)$ represents a 2×2 coherence structure matrix of an incident partially coherent Schell-model beam.

3. The method for rapidly calculating a three-dimensional polarimetric dimension according to claim 2, wherein the obtaining an electric field near a focal field after the incident electric field passes through a tight focusing system according to the vector diffraction theory comprises:

in the tight focusing system with a high numerical aperture lens, determining that a relationship existing between the incident electric field $\tau_i(\rho)$ and an electric field $\tau_0(\rho)$ that is closed to a rear surface of the high numerical aperture lens is $\tau_0(\rho)=\tau_i(\rho)N(\rho)$, wherein $N(\rho)$ is a coordinate conversion matrix; and obtaining an electric field $$\tau(r, z) = -\frac{if}{\lambda}\int_0^\alpha\int_0^{2\pi} P(\theta)D(\rho)\tau_0(\rho)e^{iks\sin\theta(x\cos\phi+y\sin\phi)}e^{-ikz\cos\theta}\sin\theta d\theta d\phi$$

near the focal field after the incident electric field passes through the tight focusing system according to the electric field $\tau_0(\rho)$ that is closed to the rear surface of the high numerical aperture lens, wherein r=(x, y) is the transverse coordinates of an observation point near the focal field, z is a longitudinal distance between the observation point and a focal point, $\tau(r,z)$ represents the electric field near the focal field, i is an imaginary number unit, $$k = \frac{2\pi n_t}{\lambda}$$

is a wave number of incident light, $n_t$ is a refractive index of a surrounding medium, $\lambda$ is a wavelength of the incident light, $\theta\in[0,\alpha]$ is an angle between a connecting line between the incident point and the focal point and the optical axis, $$\alpha = \arcsin\frac{NA}{n_t}$$

is a maximum convergence angle of a lens, NA is a numerical aperture of the lens, $D(\rho)$ is an aperture function, and P $(\theta)=\sqrt{\cos\theta}$ is an apodization function at an aperture.

4. The method for rapidly calculating a three-dimensional polarimetric dimension according to claim 3, wherein the describing a second-order correlation characteristic of a partially coherent vector beam near a tightly focused field by using a coherence matrix comprises:

describing the second-order correlation characteristic of the partially coherent vector beam near the tightly focused field by using the coherence matrix, $$\Phi(r_1, r_2, z) =$$

$$\langle\tau^\dagger(r_1, z)\tau(r_2, z)\rangle = \begin{pmatrix} \Phi_{11}(r_1, r_2, z) & \Phi_{12}(r_1, r_2, z) & \Phi_{13}(r_1, r_2, z) \\ \Phi_{21}(r_1, r_2, z) & \Phi_{22}(r_1, r_2, z) & \Phi_{23}(r_1, r_2, z) \\ \Phi_{31}(r_1, r_2, z) & \Phi_{32}(r_1, r_2, z) & \Phi_{33}(r_1, r_2, z) \end{pmatrix}$$

wherein $\langle\rangle$ represents ensemble average; and $$\Phi(r_1, r_2, z) = \frac{1}{f^2\lambda^2}\int\int\frac{D(\rho_1)D(\rho_2)}{\sqrt{\cos\theta_1}\sqrt{\cos\theta_2}}N^\dagger(\rho_1)W(\rho_1, \rho_2)N(\rho_2)$$

$$\times\exp\left[-ik\left(\rho_1\cdot\frac{r_1}{f} - \rho_2\cdot\frac{r_2}{f}\right)\right]\exp[ikz(\cos\theta_1 - \cos\theta_2)]d^2\rho_1 d^2\rho_2$$

obtaining according to the formula of the coherence matrix of the incident light field, the relational expression between the incident electric field $\tau_i(\rho)$ and the electric field $\tau_0(\rho)$ that is closed to the rear surface of the high numerical aperture lens, and the formula of the tightly focused electric field, and obtaining a coherence matrix element of the tightly focused field through arrangement as follows:

$$\Phi_{ij}(r_1, r_2, z) = \frac{1}{f^2\lambda^2}\int\int\frac{D(\rho_1)D(\rho_2)}{\sqrt{\cos\theta_1}\sqrt{\cos\theta_2}}$$
$$\times[N_{1j}(\rho_2)N_{i1}^*(\rho_1)W_{xx}(\rho_1, \rho_2)$$
$$+N_{2j}(\rho_2)N_{i2}^*(\rho_1)W_{yy}(\rho_1, \rho_2)$$
$$+N_{2j}(\rho_2)N_{i1}^*(\rho_1)W_{xy}(\rho_1, \rho_2)$$
$$+N_{1j}(\rho_2)N_{i2}^*(\rho_1)W_{yx}(\rho_1, \rho_2)]$$
$$\times\exp\left[-ik\left(\rho_1\cdot\frac{r_1}{f} - \rho_2\cdot\frac{r_2}{f}\right)\right]\exp[ikz(\cos\theta_1 - \cos\theta_2)]d^2\rho_1 d^2\rho_2, (i, j = 1, 2, 3)$$

5. The method for rapidly calculating a three-dimensional polarimetric dimension according to claim 1, wherein the obtaining a tightly focused polarization matrix based on the tightly focused coherence matrix comprises:

introducing a new coordinate expression and a Fourier transform according to a nonnegative definition condition, simplifying a matrix element of the tightly focused coherence matrix into a form of a convolution operation of two functions, obtaining a matrix element of the tightly focused polarization matrix, and obtaining the tightly focused polarization matrix based on the matrix element of the tightly focused polarization matrix.

6. The method for rapidly calculating a three-dimensional polarimetric dimension according to claim 5, wherein the introducing a new coordinate expression and a Fourier transform according to a nonnegative definition condition, simplifying a matrix element of the tightly focused coherence matrix into a form of a convolution operation of two functions, obtaining a matrix element of the tightly focused polarization matrix, and obtaining the tightly focused polarization matrix based on the matrix element of the tightly focused polarization matrix comprises:

obtaining a coherence matrix element of the tightly focused field according to the given nonnegative definition condition, $$\Phi_{ij}(r_1, r_2, z) = \frac{1}{f^2\lambda^2} \iiint$$
$$\times \{A_{1j}(\rho_2, z)B_{i1}^*(\rho_1, z)p_{xx}(v)\exp[ik(\rho_1-\rho_2)\cdot v]$$
$$+A_{2j}(\rho_2, z)B_{i2}^*(\rho_1, z)p_{yy}(v)\exp[ik(\rho_1-\rho_2)\cdot v]$$
$$+A_{2j}(\rho_2, z)B_{i1}^*(\rho_1, z)p_{xy}(v)\exp[ik(\rho_1-\rho_2)\cdot v]$$
$$+A_{1j}(\rho_2, z)B_{i2}^*(\rho_1, z)p_{yx}(v)\exp[ik(\rho_1-\rho_2)\cdot v]\}d^2v$$
$$\times \exp\left[-ik\left(\rho_1\cdot\frac{r_1}{f}-\rho_2\cdot\frac{r_2}{f}\right)\right]d^2\rho_1 d^2\rho_2, (i, j = 1, 2, 3)$$

wherein $A_{\eta j}$ ($\eta=1,2$; $j=1,2,3$) is an element in a matrix A, $B_{i\zeta}$ ($i=1,2,3$; $\zeta=1,2$) is an element in a matrix B, the matrix A and the matrix B are $$\begin{cases} A(\rho_2, z) = \dfrac{e^{-ikz\cos\theta_2}D(\rho_2)}{\sqrt{\cos\theta_2}}\tau_i(\rho_2)N(\rho_2) \\ B(\rho_1, z) = \dfrac{e^{-ikz\cos\theta_1}D(\rho_1)}{\sqrt{\cos\theta_1}}N^T(\rho_1)\tau_i^T(\rho_1) \end{cases},$$

and T represents a matrix transpose;

introducing a new coordinate expression $$\rho_s = \frac{\rho_1 + \rho_2}{2}, \rho_d = \rho_1 - \rho_2$$
$$r_s = \frac{r_1 + r_2}{2}, r_d = r_1 - r_2$$

and converting the coherence matrix element of the tightly focused field into $$\Phi_{ij}(r_1, r_2, z) = \frac{1}{f^2\lambda^4}\int$$
$$\left[\tilde{A}_{1j}^-\left(\frac{u_1}{\lambda}, z\right)\tilde{B}_{i1}^*\left(\frac{u_1-\frac{r_d}{f}}{\lambda}, z\right)\tilde{u}_{xx}\left(\frac{-\frac{r_s}{f}+\frac{r_d}{2f}-u_1}{\lambda}\right)\right.$$
$$+\tilde{A}_{2j}\left(\frac{u_1}{\lambda}, z\right)\tilde{B}_{i2}^*\left(\frac{u_1-\frac{r_d}{f}}{\lambda}, z\right)\tilde{u}_{yy}\left(\frac{-\frac{r_s}{f}+\frac{r_d}{2f}-u_1}{\lambda}\right)$$
$$+\tilde{A}_{2j}\left(\frac{u_1}{\lambda}, z\right)\tilde{B}_{i1}^*\left(\frac{u_1-\frac{r_d}{f}}{\lambda}, z\right)\tilde{u}_{xy}\left(\frac{-\frac{r_s}{f}+\frac{r_d}{2f}-u_1}{\lambda}\right)$$
$$\left.+\tilde{A}_{1j}\left(\frac{u_1}{\lambda}, z\right)\tilde{B}_{i2}^*\left(\frac{u_1-\frac{r_d}{f}}{\lambda}, z\right)\tilde{u}_{yx}\left(\frac{-\frac{r_s}{f}+\frac{r_d}{2f}-u_1}{\lambda}\right)\right]d^2u_1, (i, j = 1, 2, 3)$$

wherein $\tilde{A}_{\eta j}$ represents a Fourier transform of an element $A_{\eta j}$, $\tilde{B}_{\eta j}$ represents a Fourier transform of an element $B_{\eta j}$, * represents a conjugate, $u_{\alpha\beta}(\alpha,\beta=x,y)$ is an element in the coherence structure matrix u, and $\tilde{u}_{\alpha\beta}$ represents a Fourier transform of the element $u_{\alpha\beta}$;

letting $r_1=r_2=r$, and writing the coherence matrix element as a polarization matrix element 
$$\Phi_{ij}(r, z) = \frac{1}{f^2\lambda^2}\left\{\left[\tilde{A}_{1j}\left(\frac{-r}{f\lambda}, z\right)\tilde{B}_{i1}^*\left(\frac{-r}{f\lambda}, z\right)\right]\otimes\tilde{u}_{xx}\left(\frac{-r}{f\lambda}\right)\right.$$
$$+\left[\tilde{A}_{2j}\left(\frac{-r}{f\lambda}, z\right)\tilde{B}_{i2}^*\left(\frac{-r}{f\lambda}, z\right)\right]\otimes\tilde{u}_{yy}\left(\frac{-r}{f\lambda}\right)$$
$$+\left[\tilde{A}_{2j}\left(\frac{-r}{f\lambda}, z\right)\tilde{B}_{i1}^*\left(\frac{-r}{f\lambda}, z\right)\right]\otimes\tilde{u}_{xy}\left(\frac{-r}{f\lambda}\right)$$
$$\left.+\left[\tilde{A}_{1j}\left(\frac{-r}{f\lambda}, z\right)\tilde{B}_{i2}^*\left(\frac{-r}{f\lambda}, z\right)\right]\otimes\tilde{u}_{yx}\left(\frac{-r}{f\lambda}\right)\right\}, (i, j = 1, 2, 3)$$

wherein $\otimes$ represents a convolution operation; and substituting the converted formula of the coherence matrix element into the formula of the polarization matrix element to obtain the tightly focused polarization matrix.

7. The method for rapidly calculating a three-dimensional polarimetric dimension according to claim 1, wherein the rotating the tightly focused polarization matrix into an intrinsic coordinate frame of the tightly focused polarization matrix, and calculating a three-dimensional polarimetric dimension of the partially coherent Schell-model beam in the tightly focused field comprises:

rotating the tightly focused polarization matrix into the intrinsic coordinate frame of the tightly focused polarization matrix by using a three-dimensional spin matrix, obtaining a real part and an imaginary part of the tightly focused polarization matrix, solving an eigenvalue of the real part, and calculating the three-dimensional polarimetric dimension of the partially coherent Schell-model beam in the tightly focused field.

8. The method for rapidly calculating a three-dimensional polarimetric dimension according to claim 1, wherein a calculation formula of the three-dimensional polarimetric dimension is $$D = 3 - \frac{\sqrt{2\left[(a_1 - a_2)^2 + (a_1 - a_3)^2 + (a_2 - a_3)^2\right]}}{a_1 + a_2 + a_3},$$

wherein $\alpha_1 \geq \alpha_2 \geq \alpha_3 \geq 0$ are the eigenvalue of the real part of the polarization matrix $\Phi(r, z)$.

9. A computer device, comprising: a memory, a processor, and a computer program stored in the memory and configured to be executed by the processor, wherein the processor is configured to execute the program to implement the steps in the method according to claim 1.

10. A computer-readable storage medium, storing a computer program, wherein a processor is configured to execute the program to implement the steps in the method according to claim 1.

* * * * *